June 12, 1956
D. G. MAGILL
2,750,094
CONTAINER OVERCAP AND METHOD OF
ATTACHING SAME WITHOUT ADHESIVE
Filed July 3, 1951
2 Sheets-Sheet 1
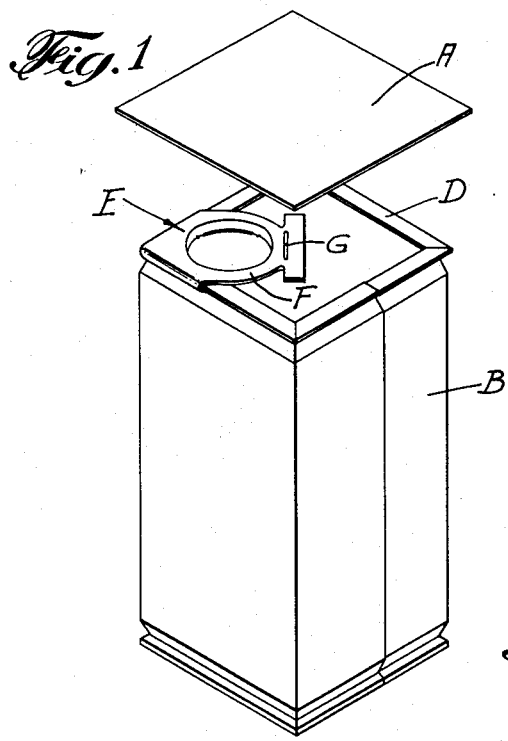
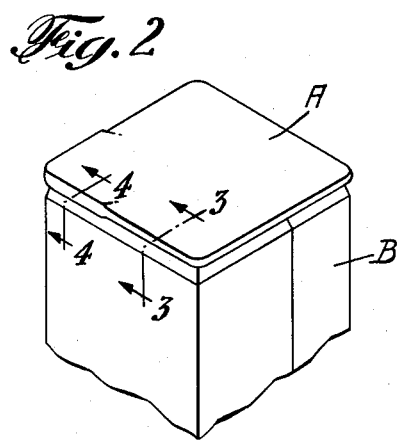
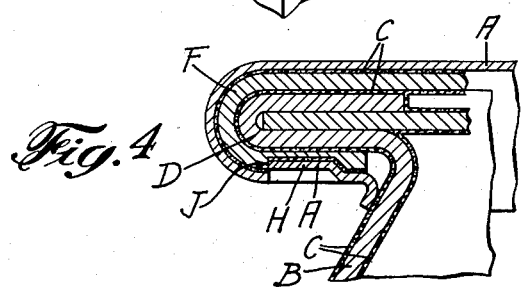
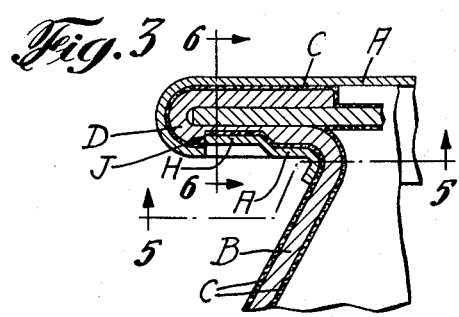
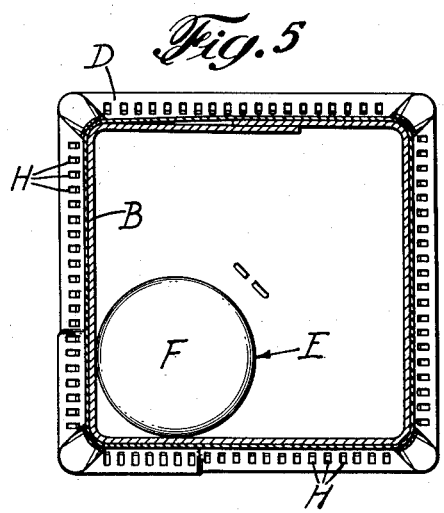
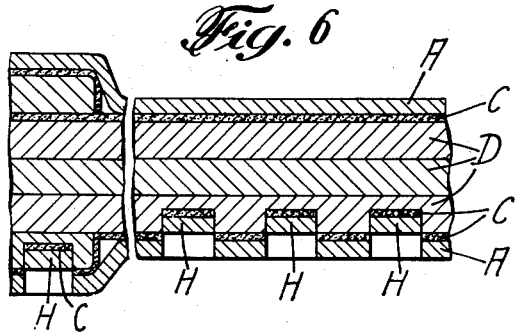
INVENTOR.
DONALD G. MAGILL
BY Charles H. Erne
Leland R. McCann
George W. Raiber
ATTORNEYS

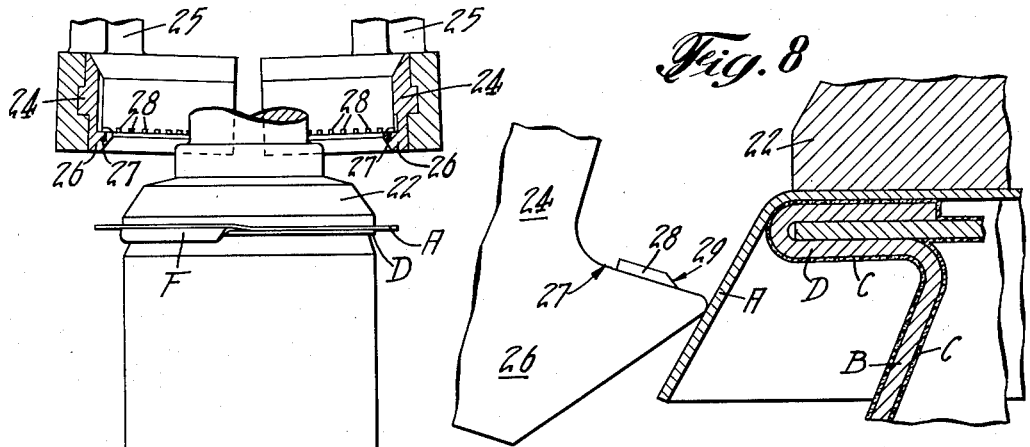

United States Patent Office 2,750,094
Patented June 12, 1956

2,750,094

CONTAINER OVERCAP AND METHOD OF ATTACHING SAME WITHOUT ADHESIVE

Donald G. Magill, Great Neck, N. Y., assignor to American Can Company, New York, N. Y., a corporation of New Jersey Application July 3, 1951, Serial No. 234,939

7 Claims. (Cl. 229—5.6)

The present invention relates to containers and has particular reference to an overcap for a container and a method of attaching the same without the use of adhesives.

This is an improvement on my United States Patent 2,357,837, issued September 12, 1944, on Container Overcap and Method of Applying Same.

In attempts to apply overcaps to containers with adhesives, considerable difficulty has been experienced in effecting a proper bond between the overcap and the container at high speed rates of production. Most methods of attaching overcaps to containers require expensive special overcap material, thermoplastic lacquers, pressure sensitive materials and heat as the final bonding agent with a time element sufficient to permit the adhesive to dry. Especially is this so where the containers are pre-coated with a film of wax.

The instant invention contemplates overcoming these difficulties by providing a method of attaching overcaps to containers without using adhesives and heat in a manner which permits the use of lower cost overcap material.

An object of the instant invention is the provision of an overcap for a container and a method of applying the same wherein a plurality of tongues, tabs, prongs or other projections are struck out from the overcap around its perimeter and embedded into the container, including any coating thereon, to mechanically lock and hold the overcap in place without the use of adhesive.

Another object is the provision of such an overcap and method of applying the same wherein attachment of the overcap to the container may be effected quickly and economically while at the same time effecting sufficient anchorage to secure the overcap against displacement during storage and handling of the container.

Another object is the provision of such an overcap and method of applying the same wherein the attached overcap may be easily removed without the use of tools, a mere loosening of an edge of the overcap providing for complete and clean separation of the entire overcap without fragmentary attachments.

Numerous other objects and advantages of the invention will be apparent as it is better understood from the following description, which, taken in connection with the accompanying drawings, discloses a preferred embodiment thereof.

Referring to the drawings:

Figure 1 is a perspective exploded view showing a container and an overcap blank in spaced relation thereto and adapted to be applied to the container in accordance with the method steps of the instant invention;

Fig. 2 is a perspective view of the upper portion of the container shown in Fig. 1, with the overcap attached;

Figs. 3 and 4 are enlarged sectional views taken substantially along transverse planes indicated by the lines 3—3, 4—4 in Fig. 2, with portions broken away;

Fig. 5 is a reduced sectional-plan view of the entire container as taken substantially along the broken line 5—5 in Fig. 3;

Fig. 6 is a greatly enlarged sectional view as taken substantially along the line 6—6 in Fig. 3, with portions broken away;

Fig. 7 is a schematic side elevation of a container and an overcap superimposed thereon and one form of apparatus for effecting the attachment of the overcap to the container, parts of the apparatus being shown in section;

Figs. 8, 9 and 10 are enlarged schematic sectional views of portions of the container, the overcap and principal parts of the apparatus, the views showing the steps of attaching the overcap to the container; and Fig. 11 is an enlarged plan view of overcap attaching jaws shown in Fig. 7, the jaws being shown in closed relation.

As a preferred or exemplary embodiment of the invention, Figs. 1 to 6 inclusive of the drawings disclose a sheet material overcap A (Fig. 1) which is adapted to be applied over the top end of a rectangular shaped fibre milk container B of the character shown in United States Patent 2,085,979, issued July 6, 1937, to John M. Hothersall on Container.

The container B preferably has an overall coating C of wax to protect it against moisture. Such a container at its top end is formed with an overhanging peripheral ledge or rim D. The top of the container preferably at one corner thereof is provided with a filling and dispensing opening E (Fig. 5) which is closed by a friction plug closure element F hingedly secured to the container top by a staple G. The friction plug closure element F extends out over and is crimped under the ledge D to protect the pouring surface.

The overcap A preferably is a thin transparent protective web of material such as glassine, parchment, "cellophane," "Pliofilm" or "Koroseal" or other similar web material, although the invention is equally well adapted to other materials and to metallic web materials such as foils and the like. The overcap is slightly larger than the top of the container B and is applied to the top of the container over the closure element F, to protect the entire top of the container. The marginal edge portions of the overcap extend down around the peripheral ledge D of the container as best shown in Figs. 3 and 4 and fit tightly against the under side of the ledge. At the corners of the container the marginal edge portions of the overcap are tucked in neatly under the ledge D.

At spaced intervals, entirely around the container, the folded-under marginal edge portions of the overcap are secured in place mechanically without the use of adhesives, by tongues, tabs, prongs or other projections H which preferably are rectangular in configuration. These projections H extend transversely of the ledge D, from the container side wall outwardly toward the peripheral edge of the ledge, as best shown in Fig. 5. Each projection is struck-out from the material of the overcap which preferably is cut through along the two parallel longitudinal sides of the projection and along the outer end of the projection thus producing a blunt free end. The inner end of the projection is uncut and remains hingedly attached to the overcap.

The severed portion, bounded by three cut edges, of these projections is pressed inwardly through the wax coating on the container and is embedded into the material of the container along the underside of the ledge D as best shown in Figs. 3 and 6. Where the closure element F also extends over the ledge D as shown in Fig. 4, the projections H are embedded into the crimped under portion of the closure element (Fig. 4). The outer or blunt free ends of the projections H abut sharply against a slight shoulder J (Figs. 3 and 4) produced in the underside of the ledge D and the crimped under portion of the closure element F and thus lock and hold the folded under marginal edge portions of the overcap against displacement during storage and handling of the container. When it is desired to open the container, the entire overcap may be readily torn off to gain access to the closure elment F. If desired, a mere loosening of one edge of the overcap will permit the entire overcap to be peeled off clean without leaving any torn fragments attached to the container.

The method of applying such an overcap A to the container B is schematically shown in Figs. 7 to 11 inclusive of the drawings. Before applying the overcap A to the top of the container B, the overcap is a flat blank as shown in Fig. 1. This blank overcap is superimposed in any suitable manner on the top of a container B with the marginal edge portions of the overcap extending outwardly beyond the periphery of the ledge D of the container. These overhanging edge portions of the overcap A are first bent downwardly around the peripheral edge of the ledge D of the container as best shown in Fig. 8 and then folded upwardly against the underside of the ledge D as best shown in Fig. 9.

While the overcap is thus held against the ledge, the tongues, tabs, prongs or projections H are formed in the overcap to hold it in place as best shown in Fig. 10. This forming of the projections is effected by cutting the marginal edge portions of the overcap adjacent the underside of the ledge D along pairs of parallel lines of severance extending transversely of the ledge and by cutting along straight lines of severance connecting pairs of the parallel cuts at a place adjacent the outer periphery of the ledge. This cutting action along three sides of the projections leaves the projections hingedly connected to the overcap at a place remote from the peripheral edges of the ledge D and simultaneously provides a blunt free end for each projection, these free ends being disposed adjacent the peripheral edges of the ledge D.

The free ends of the projections are then forced inwardly through the wax coating on the container and are embedded in the underside of the ledge D. During this embedding action a shoulder is formed in the underside of the ledge and adjacent the blunt free end of each projection for the free ends of the projections to abut against. These shoulders anchor the projections against outward lateral displacement to lock and hold the overcap onto the container.

In the form of apparatus shown in the drawings by way of example, the container rests on a vertically movable lifter pad 21 (Fig. 7) and the overcap is held in place on the top of the container by a vertically movable clamping head or chuck 22. With the container B and its overcap A clamped between the lifter pad 21 and the chuck 22, the lifter pad raises the entire assembly up into a crimping head of the type disclosed in United States Patent 2,406,784, issued September 3, 1946, to A. E. Almgren on Overcap Applying Machine. This crimping head includes a set of four right angle jaws 24 which are carried on the lower ends of pivotally mounted arms 25 (Fig. 7).

The jaws 24 are disposed around the vertical axis of the chuck 22. The lower edge of each jaw 24 is formed with an inwardly projecting crimping seat 26 having a flat top face 27 formed with upwardly extending punches or teeth 28 of substantially the same dimensions as the tongues, tabs, prongs or projections H. Adjacent the corner of one of the jaws 24, (the lower left corner as viewed in Fig. 11) the punches or teeth 28 are lower and slightly longer than the others to compensate for the extra thickness of stock of the closure element F as viewed in Fig. 4. These punches or teeth 28 extend transversely of the seat 27, the outer edge and the two side edges of each punch being formed with sharp cutting edges, while the inner edge is formed with a bevel or taper 29.

In the open position of the jaws 24, as shown in Fig. 7, the seats 26 of the jaws are spread apart sufficiently to permit the chuck 22 and the ledge D of the container to move up between the jaws. However this opening is not sufficient to permit the overhanging marginal edge portions of the overcap A to pass through, with the result that as the chuck 22 and the ledge D move up past the jaws, the jaws engage the overhanging marginal edge portions of the overcap and wipe or bend them downwardly around the outer periphery of the ledge D as shown in Fig. 8. The chuck 22, the container B, and the lifter pad 21 cease their upward travel when the underside of the ledge D reaches a level substantially in alignment with the top faces 27 of the jaw seats 26.

The jaws 24 then move in toward and completely surround the container as in the closed position of the jaws shown in Fig. 11. This movement of the jaws into the position shown in Figs. 9 and 11 folds the depending marginal edge portions of the overcap A inwardly and upwardly and presses the overcap edge portions against the underside of the ledge D as shown in Fig. 9. With the overcap edge portions held in this position, a downward pressure is exerted on the chuck 22 and this pressure forces the ledge D of the container and the crimped-under edge portions of the overcap, down onto the punches or teeth 28 as shown in Fig. 10 with the result that the tongues, tabs, prongs or projections H are produced in the overcap edge portions and are forced through the wax coating on the container and are embedded into the underside of the ledge D and the closure element F to lock and hold the overcap in place as mentioned above.

After thus producing the projections H in the crimped under overcap edge portions, the jaws 24 are swung back to their original positions (Fig. 7) clear of the container. The chuck 22 and the lifter pad 21 then move down to extract the container from the crimping head and to locate it in a position for discharge. This completes the steps of applying the overcap to the container.

It is thought that the invention and many of its attendant advantages will be understood from the foregoing description, and it will be apparent that various changes may be made in the form, construction and arrangement of the parts and that changes may be made in the steps of the process described and their order of accomplishment without departing from the spirit and scope of the invention or sacrificing all of its material advantages, the form hereinbefore described being merely a preferred embodiment thereof.

I claim:

1. The method of attaching an overcap of thin sheet material to the top end of a container having a laterally projecting ledge without the use of adhesives, comprising the steps of placing the overcap on the top of the container with the marginal edge portions of the overcap projecting beyond the peripheral edges of said ledge, folding the marginal edge portions of the overcap downwardly around the peripheral edges of said ledge, pressing the folded marginal edge portions of the overcap against the underside of said ledge, cutting the marginal edge portions of said overcap adjacent the underside of said ledge along pairs of parallel lines of severance extending transversely of said ledge and adjacent the periphery of said ledge, cutting said marginal edge portions of said overcap along lines of severance connecting pairs of parallel cuts to produce a plurality of projections hingedly connected to said overcap and having blunt free ends disposed adjacent the peripheral edges of said ledge, embedding the blunt free ends of said projections into the underside of said ledge, and simultaneously with said embedding step forming a shoulder in the underside of said ledge adjacent the blunt free ends of said projections to anchor said projections against outward lateral displacement to lock said overcap to said container.

2. The combination of a container having adjacent its top end a laterally projecting ledge and an overcap of thin sheet material overlying the top end of the container, the marginal edge portions of said overcap extending downwardly over and around said container ledge and inwardly against the underside of said ledge, and a plurality of substantially rectangular projections cut from the marginal edge portions of said overcap on the underside of said ledge, the free ends of all said projections being directed outwardly toward the edge of said container ledge and embedded in the underside of said ledge, whereby said overcap is locked in place on said container top end and is readily removed therefrom by pulling said overcap marginal edge and projections outwardly from said underside of the ledge.

3. The combination of a container having adjacent its top end a laterally projecting ledge and an overcap of thin sheet material overlying the top end of the container, the marginal edge portions of said overcap extending downwardly over and around said container ledge and inwardly against the underside of said ledge, and a plurality of projections cut from said marginal edge portions of the overcap and embedded in the underside of said ledge, each of said projections having its inner end integral with the overcap and its outer embedded end extending toward the edge of said container ledge, whereby said overcap is locked in place on said container top end and is readily removed therefrom by pulling said overcap marginal edge and projections outwardly from said underside of the ledge.

4. The combination of a container having adjacent its top end a laterally projecting ledge and an overcap of thin sheet material overlying the top end of the container, the marginal edge portions of said overcap extending downwardly over and around said container ledge and inwardly against the underside of said ledge, and a plurality of substantially rectangular projections cut from the marginal edge portions of said overcap and embedded in the underside of said ledge, each of said projections being hingedly attached at its inner end to said overcap adjacent the free edge of the overcap and having its blunt embedded end extending outwardly toward the periphery of said container ledge and abutting a shoulder formed in the underside of the ledge, whereby said overcap is locked in place on said container top end and is readily removed therefrom by pulling said overcap marginal edge and projections outwardly from said underside of the ledge.

5. The method of attaching an overcap of thin sheet material to the top end of a container having a laterally projecting ledge without the use of adhesives, comprising the steps of placing the overcap against the top of the container with the marginal edge portions of the overcap projecting beyond the periphery of said ledge, folding the marginal edge portions of the overcap downwardly around the peripheral edges of said ledge, pressing the folded marginal edge portions of the overcap against the underside of said ledge, cutting substantially rectangular projections in the marginal edge portions of said overcap adjacent the underside of said ledge with the free ends of the projections extending toward the periphery of said container ledge, and embedding said projections into the underside of said ledge to hold said overcap in place on said container.

6. The method of attaching an overcap of thin sheet material to the top end of a container having a laterally projecting ledge without the use of adhesives, comprising the steps of placing the overcap against the top of the container with the marginal edge portions of the overcap projecting beyond the periphery of said ledge, folding the marginal edge portions of the overcap downwardly around the peripheral edges of said ledge, pressing the folded marginal edge portions of the overcap against the underside of said ledge, cutting in the marginal edge portions of said overcap adjacent the underside of said ledge a plurality of projections extending transversely of said ledge and hingedly connected to said overcap remote from said periphery of the ledge, and embedding the free ends of said projections into the underside of said ledge adjacent said periphery of the ledge to hold said overcap in place on said container.

7. The method of attaching an overcap of thin sheet material to the top end of a container having a laterally projecting ledge without the use of adhesives, comprising the steps of placing the overcap on the top of the container with the marginal edge portions of the overcap projecting beyond the periphery of said ledge, folding the marginal edge portions of the overcap downwardly around the peripheral edges of said ledge, pressing the folded marginal edge portions of the overcap against the underside of said ledge, cutting the marginal edge portions of said overcap adjacent the underside of said ledge along pairs of parallel lines of severance extending transversely of said ledge, cutting said marginal edge portions of said overcap along lines of severance connecting the ends of pairs of parallel cuts adjacent said periphery of the ledge to produce a plurality of projections hingedly connected to said overcap remote from said periphery of the ledge and having blunt free ends disposed adjacent said periphery of the ledge, and embedding said blunt free ends of the projections into the underside of said ledge to hold said overcap in place on said container.

References Cited in the file of this patent

UNITED STATES PATENTS

| | | |
|---|---|---|
| 755,275 | Clay | Mar. 22, 1904 |
| 783,593 | Rosenthal et al. | Feb. 28, 1905 |
| 994,179 | Meyer | June 6, 1911 |
| 1,239,223 | Ross | Sept. 4, 1917 |
| 1,565,765 | Walter | Dec. 15, 1925 |
| 1,854,424 | Peelle | Apr. 19, 1932 |
| 2,169,804 | Kniesche | Aug. 15, 1939 |
| 2,192,424 | Wilson | Mar. 5, 1940 |
| 2,303,322 | Bigger | Dec. 1, 1942 |
| 2,338,019 | Baker | Dec. 28, 1943 |
| 2,341,379 | Householder et al. | Feb. 8, 1944 |
| 2,357,837 | Magill | Sept. 12, 1944 |

FOREIGN PATENTS

| | | |
|---|---|---|
| 22,536 | Great Britain | Oct. 12, 1907 |